(12) United States Patent
Piccoli

(10) Patent No.: US 7,758,406 B2
(45) Date of Patent: Jul. 20, 2010

(54) SYSTEM FOR THE CONTROL OF STUNNING CURRENT IN A BIRD SLAUGHTERING EQUIPMENT, CONTROLLING DEVICE FOR STUNNING CURRENT AND BIRD STUNNING METHOD

(75) Inventor: Giancarlo Piccoli, Sao Paulo (BR)

(73) Assignee: G.A. Tecnologia Ltda., Sao Paulo/SP (BR)

( * ) Notice: Subject to any disclaimer, the term of this patent is extended or adjusted under 35 U.S.C. 154(b) by 0 days.

(21) Appl. No.: 12/195,110

(22) Filed: Aug. 20, 2008

(65) Prior Publication Data

US 2009/0053986 A1    Feb. 26, 2009

(51) Int. Cl.
*A22B 3/06* (2006.01)
(52) U.S. Cl. ...................................... 452/59
(58) Field of Classification Search ................... 452/58, 452/59
See application file for complete search history.

(56) References Cited

U.S. PATENT DOCUMENTS

| | | | | |
|---|---|---|---|---|
| 3,981,045 A | * | 9/1976 | Collins | 452/58 |
| 5,487,698 A | * | 1/1996 | Kettlewell et al. | 452/58 |
| 5,954,572 A | * | 9/1999 | Kettlewell et al. | 452/58 |
| 5,954,573 A | * | 9/1999 | Ohgaki et al. | 452/67 |
| 6,019,674 A | * | 2/2000 | Austin | 452/59 |
| 6,471,576 B1 | * | 10/2002 | Ross | 452/58 |

* cited by examiner

*Primary Examiner*—Thomas Price
(74) *Attorney, Agent, or Firm*—Volpe and Koenig, P.C.

(57) ABSTRACT

System for the control of stunning current in a bird slaughtering equipment, controlling device for stunning current and bird stunning method A system, method and device to slaughter birds (13) are disclosed. The system comprises a first sensor group (15) to detect the hooks (12) from the line (11) and a second sensor group (16) to detect the presence of a bird (13) at a corresponding hook (12) upstream from the tub (14). Stunning characteristics (current, frequency, wave form and tension) are pre-programmed at a stunning current controlling device (20), which controls a power supply (28) so that the working power as supplied by the supply (28) is a function of the real quantity of birds (13) inside the tub (14) as detected by the sensor groups (15, 16).

12 Claims, 2 Drawing Sheets

SYSTEM FOR THE CONTROL OF STUNNING CURRENT IN A BIRD SLAUGHTERING EQUIPMENT, CONTROLLING DEVICE FOR STUNNING CURRENT AND BIRD STUNNING METHOD

FIELD OF INVENTION

The present invention refers to the field of animal slaughtering industry, more particularly to the field of bird slaughtering industry, even more particularly the bird stunning step.

BACKGROUND

As widely known in the art, slaughtering of birds such as chicken and similar is an in-line process. In bird slaughtering equipments, a suspended line in closed circuit is designed and provided with a series of hooks to support the birds, which travel under speed which is pre-determined by the line. In a first loading station, birds are tied to said hooks by their feet and therefore move through the line upside down. In a second station, the birds are submitted to a step called stunning. In that step, the bird's head, supported by the line hook, is immersed into a tub containing an electricity-conducting liquid. As the head of the bird enters the tub, the bird closes an electric circuit where the poles are the hook/line and the electricity conducting liquid/tub, and the bird is therefore stunned by means of controlled shock. Upon stunning the bird, the continued movement of the line transports the stunned bird to a slaughtering station as properly stated, where the bird is slaughtered by decollation, and to a bleeding station designed to take off as much blood as possible from the slaughtered and decollated bird. Therefore, the bird may be unloaded or submitted to complementary steps according to the type of equipment at issue. Anyway, free line hooks are again transported to the bird loading station to upload a new bird and thus restart the working cycle. A few references to bird slaughtering line stations may be found in patents GB 1,123,300 dated May 10, 1966; GB 1,188,869 dated Apr. 22, 1970; U.S. Pat. No. 3,828,397 dated Aug. 13, 1974; U.S. Pat. No. 4,751,767 dated Jun. 21, 1988; as well as in the publication WO 97/01284 published on Jan. 16, 1997.

The size of the line, in terms of length, the quantity of hooks held by the line and the speed of displacement of said hooks through the line circuit are inherent characteristics to each equipment and, as a function of said characteristics, a maximum capacity of bird slaughtering may be established for each equipment. Said maximum slaughtering ability, however, is limited by a number of operational factors, among which we should highlight that a hook frequently travels empty through the circuit for being not possible to fill it at the loading station. This happens because the birds, in this step of the process, are alive and do not move according to any programmable behavior model.

For the slaughtering and bleeding steps, the lack of a bird in a hook does not bring in huge inconveniences, aside from the mere productivity reduction. In the stunning step, however, this problem may be much more relevant.

As known, the fixed tub has a given length over the direction of hook displacement by the line and thus may receive a given quantity of birds, which may be calculated by the ratio between the length of the tub and the distance between each hook in the line. To apply the stunning current to birds inside the tub (specifically with the head inside the tub and tied by their feet to the hooks on the line), the line is connected to a first pole of a stunning device, while the tub containing a conducting liquid (e.g. pure water or saline solution, among others) is connected to a second pole of said stunning device. The stunning device keeps a potential difference between the tub and the line, so that each bird inside the tub is submitted to the passage of stunning current. The efficient stunning of each bird is an essential requirement for consecutive steps (slaughtering and bleeding) to be successfully performed.

As known by the experts in the art, efficient stunning of birds is directly related to better quality and higher productivity of processed meat. As an example, if the stunning current is not appropriate, hematomas may be formed, mainly on the bird chest region, by disrupting vessels and bones, increasing loss in the quantity of produced meat. Furthermore, stunning influences bird relaxing conditions (including contraction or distension of birds' arteries and capillaries), among others, and therefore influences the grade of bird bleeding after slaughtering. On the other hand, it is also known that the lower the quantity of residual blood in the bird, the better the quality of produced meat. For better reference to the bleeding step, please refer to the U.S. Pat. No. 5,954,573 dated Sep. 21, 1999.

In this sense, the state of the art forecasts a number of stunning devices or devices to control the type of current to be applied to birds during stunning. Therefore, these devices supply currents presenting alternated sinusoidal, square, sawtoothed etc. or continued waves, so to improve stunning. According to the most recent skills, birds should be stunned by means of electrical discharges under low tension and with high frequency. References concerning the forms of current being employed to stun birds may be obtained from the following documents: U.S. Pat. No. 3,474,490 dated Sep. 18, 1968; NL 1,006,091 published on Nov. 25, 1998; and NL 1,007,271, published on Apr. 19, 1999. Furthermore, the document FR 2,610,163 dated Jul. 29, 1988 discloses stunning by means of continued current.

Furthermore, and specifically when birds are slaughtered bearing in mind their purchase by specific ethnic/religious groups, various standards should be followed for the meat to be consumed. In these cases, slaughtering is supervised by a religious representative who should confirm that meat processing conditions have followed imposed patterns. It is not rare that said standards impose stunning current/tension conditions not compatible to efficiently stun a bird. Furthermore, the imposition of maximum or minimum current, or within a pre-determined range, may be complex due to the currently available equipment in the market.

Finally, and also as known by the experts in this field, permeability to the passage of an electric current or, inversely, birds' electric resistance varies according to their condition. Therefore, a group of birds may have different electric resistance from other groups as a function of the humidity of the bird (resulting from previous bird washing), feeding, quantity of ingested liquids, size of the bird, bird species, etc. Therefore, the control of the stunning current may be very difficult as a function of variations found from bird to bird.

Furthermore, and despite all regulations in this field being in terms of the characteristics of the stunning current, systems currently available in the market do not include automatic means to efficiently control the stunning current for each bird.

A system, method and device intended to efficiently control the slaughtering current of each bird within a device for bird slaughtering is therefore required.

SUMMARY

The above problems may be overcome by means of a system for the control of stunning current in a bird slaughtering equipment, a controlling device for stunning current and a bird stunning method, as per the present invention, which includes the control of power supplied as a function of the number of birds existing inside the tub.

More specifically, the present invention comprises a system for the control of stunning current in a bird slaughtering equipment, said system comprising a line supporting a series of equally distant hooks and a stunning tub, and the birds, tied by their feet to the hooks, are submitted to stunning current when partially dipped into the tub and the stunning current is supplied by a device to control the stunning current which poles are connected to the line and the tub by the lines. The system has a first sensor group intended to detect the presence of hooks and a second sensor group intended to detect the presence of birds. The first and second sensor groups are located upstream from the tub. The controlling device of the stunning current supplies a stunning current which is a function of the real number of birds existing inside the tub at the time of bird stunning.

A bird stunning method is still provided and comprises the following steps: to detect, upstream from the tub, a hook by means of a first sensor and detect the presence of a bird on said hook by means of a second sensor; to store information related to the hook and the presence or not of a bird on said hook until said hook arrives at the tub; to calculate how many birds are inside the tub; and to control the working power of the source so that, no matter which is the calculated number of birds inside the tub, each bird receives stunning current which is equal to a pre-programmed stunning current.

Finally, a stunning current controlling device is also disclosed and comprises: a first inlet to receive information regarding pre-scheduling of the stunning current; a second inlet to receive signals coming from said first and second sensor groups; at least one memory to store received information; at least one processor to process received information and store information processed by at least one memory; to recover from the at least one memory information received and processed when required; as well as to process and supply outlet standards to the stunning current as a function of the real number of birds inside the tub; and an intelligent supply able to emit useful power through lines as a function of outlet standards as supplied by at least one processor.

BRIEF DESCRIPTION OF THE DRAWINGS

The object of the present invention may be better understood in the light of the detailed description as follows, relative to preferential ways of embodiment of the invention, which is made jointly with the attached drawings, wherein.

DETAILED DESCRIPTION OF THE PREFERRED EMBODIMENTS

Figure 1:
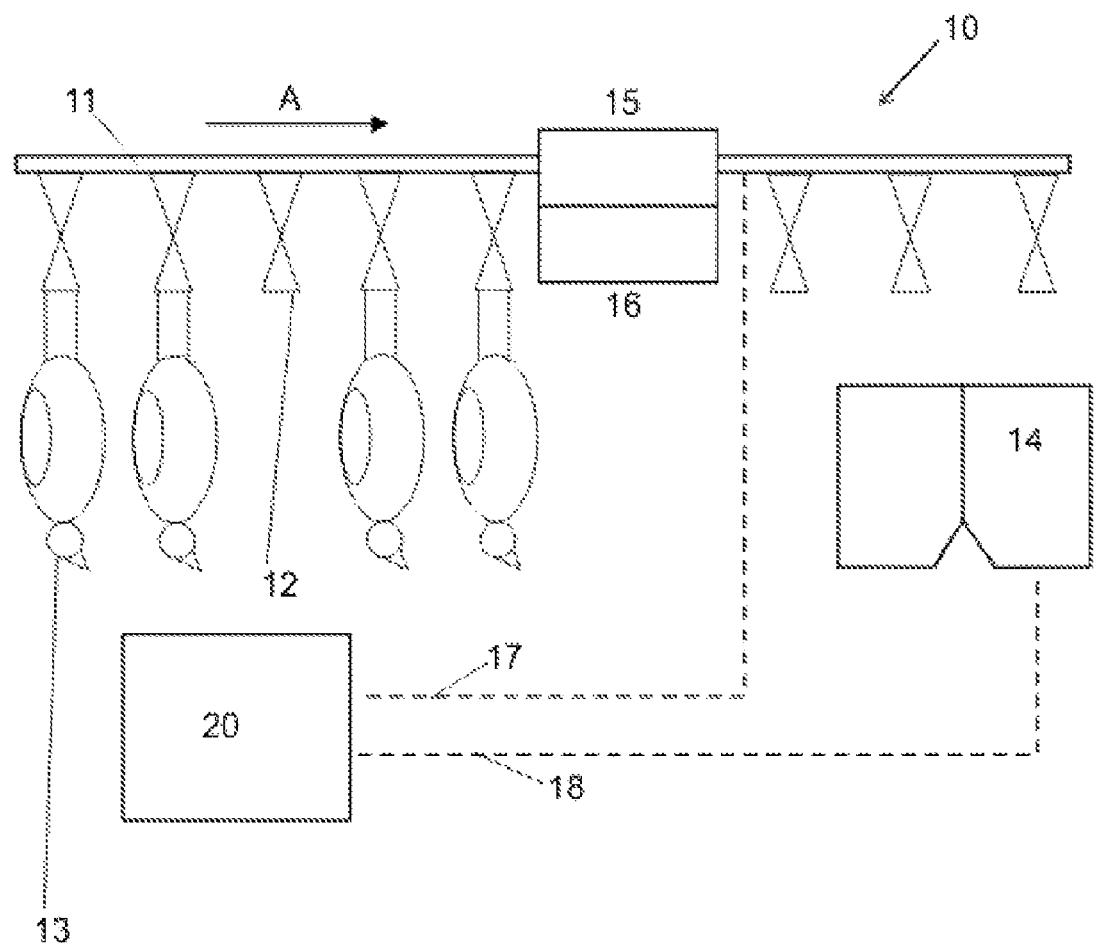
FIG. 1 is a schematic view of the stunning station of a bird slaughtering line of the present invention.

According to an aspect of the present invention, FIG. 1 schematically shows part of an equipment intended to bird slaughtering in general. Specifically, FIG. 1 only shows the stunning station 10. The stunning station 10 is basically composed by a suspended trail or a line 11, as better known in the art, supporting a number of hooks 12, also being able to displace said hooks 12 in the direction of the arrow A under a given advancement speed.

Before the stunning station 10 (at left on FIG. 1), the bird slaughtering equipment or line presents a bird loading station (not shown), wherein birds are tied to the hooks 12 by their feet, i.e. being upside down. After the stunning station 10, the bird slaughtering line includes a slaughtering station as properly stated (not shown), wherein birds are slaughtered by means of decollation and, downstream from it, the slaughtering line includes a bleeding station (not shown), intended to take the blood retained within a bird by gravity.

Specifically concerning the line 11, it is formed by a suspended rail supporting a number of equally distant hooks 12 displacing them by means of the closed circuit limited by the line 11. At the stunning station 10, below the line 11, a tub 14 is included, preferably made of isolating material with an immersed metallic electrode, wherein the birds 13 supported by the hooks 12 are partially dipped inside said tub 14 and within a liquid contained inside it. Said liquid is an electric current conducting liquid. Furthermore, the line 11 is linked to an electric pole, while the tub 14 is linked to a complementary pole so that, when the bird 13 is dipped into the tub 14, the latter receives an electric discharge, in the form of a sinusoidal, square, saw-toothed alternated current or even as continued current, or with any other desired characteristic.

The above description refers to the widely known aspects in the state of the art, for which reason it was made more concisely. However, the inventors discovered a surprisingly simpler way to obtain a much more accurate control of the stunning current. The efficiency of stunning is directly linked to the current flowing through each bird. As the number of birds in the tub varies with time (not as a function of the characteristics of the line or the system itself, but simply as a function of the number of hooks loaded over the line), the full current fluctuates, not allowing the average current flowing through each bird to be determined, causing lack of control of the average current for each bird. This variation in the stunning current causes various stunning rates, which is undesirable since, besides compromising the following step (slaughtering), it may compromise the quality of the meat at the end of the process.

The innovative and surprisingly simple solution to control the average stunning current passing through each bird is to control the power as supplied by the stunning current controlling device 20 as a function of the real number of birds 13 inside the tub 14. More specifically, and by determining the stunning current per bird (total stunning current divided by the real number of birds inside the tub), it is possible to accurately control, moment after moment, the stunning current for each bird and thus adjust the working power of the source (by means of supply tension variation), so that each bird is always stunned with a current within previously established standards by the user. The assumption of this new controlling technology is exactly to control the real number of birds inside the tub.

In the devices of the state of the art, an electric current generator (whichever may be the type of current) was regulated to supply a given electric current with given total tension (as applied between the line and the tub). The control of the individual average current is not yet effected, since said equipment is unable to detect the real number of birds inside the tub. In an attempt to control the current based only on the total current, if the tub held ten birds and the tension applied between the tub and the line were 100 V, each bird would receive e.g. an average current of 100 mA. If at any time, however, the tub had only eight birds (i.e. with two empty hooks), each bird would receive an electric current which is almost 20% above the standard, and the tension might be slightly reduced (higher or lower reduction as a function of the characteristics of the generator). Furthermore, should the equipment start to operate with a new batch of birds (e.g.

bigger birds than the previous batch), equipment should be manually and fully readjusted due to the change of electric resistance of each bird. Also, if humidity conditions of birds within a same batch of birds changed, also in this case conventional systems should be manually adjusted, since they would be unable to promptly detect such variations in characteristics of birds being slaughtered. Due to the above specified problems, in fact there is not in the market today an automatic control system for stunning current in bird slaughtering lines. On the other hand, systems currently available in the market have their stunning conditions manually controlled, thus causing considerable percentage of losses. For example, if the stunning current (as a function of a change in bird conditions, such as size, humidity, etc.) increases beyond the ideal stunning standards, such fact (which, as known, compromises the quality of the bleeding as effected) will only be noticed after about one hour (at the end of the slaughtering line). Therefore, and in a conventional slaughtering line, we may be dealing with a partial loss per bird in about 10,000 birds.

So to implement the solution of the present invention, the line 11 comprises a first sensor group 15 intended to detect the passage of a hook 12, as well as a second sensor group 16 intended to determine the passage of a bird 13 tied to a hook 12. Furthermore, the stunning station 10 also includes a stunning current controller 20 supplying stunning power as a function of the real number of birds 13 inside the tub 14.

More specifically, in a region before the tub 14, the system includes the location of a first sensor group 15, which function is to identify the passage of a hook 12 through the detection region. Said sensor 15 may be an optical sensor, a laser beam sensor, an acoustic presence sensor, an electromechanical sensor generating a pulse when the hook 12 passes through the region of detection or any other type of sensor able to determine the passage of a hook 12 through the detection region.

In the same way, the system includes providing a second sensor group 16, which object is to identify the passage of a bird 13 through the detection region. Said sensor 16 may be an optical sensor, a laser beam sensor, an acoustic presence sensor, an electromechanical sensor generating a pulse when the bird 13 passes through the region of detection or any other type of sensor able to determine the passage of a bird 13 through the detection region.

Furthermore, the system also comprises a stunning current controlling device 20 which outlets 17 and 18, respectively, are connected to the body of the line 11 and the body of the tub 14, so to apply stunning current to each bird 13 as partially dipped within the tub 14. Basically, the device 20 receives information coming from the sensor groups 15 and 16 and adapts the exit tension so to apply to each bird 13 a current such as a previously adjusted standard. A more detailed description of the device 20 will be supplied further below.

Concerning the operation, the stunning current controlling device 20 is initially configured to operate the system within pre-determined current and tension. Said adjusted values may be in the form of exact values, minimum values, maximum values or even values within a range of operation. From the start of the system, or specifically the line 11, sensor groups 15 and 16 start respectively to count hooks and chickens being displaced through the detection region. The sensor group 15, besides detecting the passage of hooks 12, determines the speed of displacement of the line 11 (which may be obtained from the time between the passage of a hook through two contiguous sensors or by determining the time between the passage of a hook and the subsequent hook through one single sensor, since the distance between two consecutive hooks of the line does not change). At the same time, the sensor group 16 identifies the presence or not of a chicken 13 on the hook 12 and thus informs said condition of the hook 12 to the device 20.

Therefore, the device 20, fed by the information from sensor groups 15 and 16, calculates the speed of the line 11, fixes the position of the hook 12 and identifies the presence of a bird 13 on said hook. When said hook 12 arrives at the region corresponding to the inlet of the tub 14, the system processor 22 sums to the loading memory 23 of the tub the presence of one bird 13 and thus adjusts the power to be transferred to the poles of the line 11 and the tub 14, respectively via lines 17 and 18. When said hook 12 arrives at the outlet of the tub 14, the processor subtracts one bird from the loading memory of the tub (if there is a bird located on said hook). This is possible because the device 20 has stored the information concerning the length of the tub 14 (in terms of bird capacity), as well as the speed of displacement of the line 11. By repeating said operation for each individual and consecutive hook, the system is able to always have, in the loading memory of the tub, the exact information of how many birds can be found inside the tub 14.

In a preferred way of embodiment of the present invention, the system is only fed with the information concerning the capacity of the tub 14 and the number of hooks between the sensor groups 15 and 16 and the first hook 12 inside the tub. Therefore, from the passage of a hook through the sensor group 15, the system automatically adds to the tub the hook located as many positions before as many hooks between the sensor 15 and the tub 14, also eliminating one hook which is located as many positions before as many hooks are summed between the sensor 15 and the tub with the capacity in hooks of the tub. In other words, every time a hook 12 passes through the sensor 15, the system includes inside the tub the immediately previous hook to the edge of the tub (summing one bird or not according to the reading of the sensor 16) and takes off from the tub 14 the last immersed hook, subtracting from the sum of birds one unit if this hook is loaded. This way of embodiment of the present invention is simpler, since it requires the feeding of less information (i.e. the size of the tub in hooks and the distance between the sensors and the tub, also in hooks).

With the precise information of how many birds there are, at each moment, inside the tub, the system identifies the stunning current running through the circuit (limited by the source 28, the path 17, the line 11, the bird 13, the tub 14, the path 18 returning to the source 28), calculates the average current per bird (full stunning current divided by the real number of birds) and adjusts the working power of the source 28 (tension regulation) so that, always in average, each bird 13 receives the stunning current according to the standards as previously adjusted by the user of the system.

Figure 2:
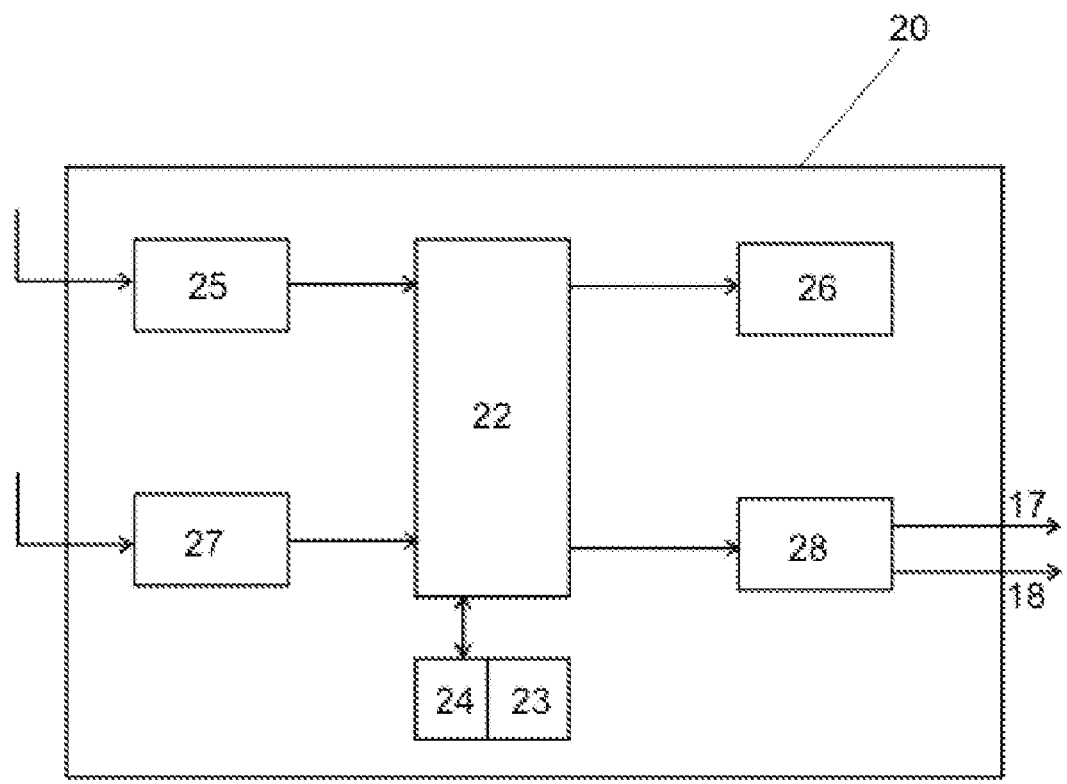
FIG. 2 is a block diagram of the stunning current controlling device as per a preferential way of embodiment of the present invention.

Another object of the present invention is a stunning current controlling device 20. According to FIG. 2, and in a way of embodiment of the invention, said device 20 is constituted by a processor 22, intended to make the various calculations as required, a memory device 24 designed to store various pre-established schedules and those inserted by the user, store various system operational standards, store the quantity of birds 13 inside the tub 14 (tub loading memory 23), besides other required information as related to the system, such as, in a preferential way of embodiment of the invention, the distance in hooks between the sensors and the tub and the capacity of the tub in terms of hooks 12 or, according to an alternative way of embodiment of the invention, the distance between the hooks 12, the calculated speed of the line 11, etc.

The device 20 still comprises a power supply 28 able to feed the poles located at the line 11 and the tub 14 with tension, frequency and current determined by the processor 22. Furthermore, said device 22 also counts on an inlet interface 27 appropriate to receive the information coming from sensor groups 15 and 16, as well as an inlet 25 to receive user programming and/or select the ways of operation as previously established (stored at the memory 24). Finally, the device 22 also counts on a display 26 to show the user the indicated standards, tension/current/frequency currently in use (per batch or per bird), history of the effected operations, updated counting of stunned birds and finally any information stored in the memory 24 as received by the sensor groups, stored or calculated by the processor.

More specifically, the processor 22 may be a general processor or a processing unit dedicated and programmed to perform pre-determined features for the device 20. The processor 20 may also be a set of one or more processors and, in case of more than one processor, each processor is responsible for performing one or more given calculations. As used herewith, the term "processor" refers to microprocessors, central processing units (CPU), application specific integrated circuits (ASIC), logical circuits and/or circuits or processors able to perform the features of the device 20.

Memories 24 and/or 23 or storage resources include solid state memory (e.g. random access memory (RAM), read-only memory (ROM) and/or flash memory), magnetic storage devices (e.g. floppy discs and hard discs (HD)), optical storage devices (e.g. CD-ROM, CD-RW and DVD) and similar. Furthermore, and in a given way of embodiment, memories 24 and 23 may be incorporated into one single data storage device. In another way of embodiment of the present invention, memories 24 and 23 may be incorporated into different data storage devices.

The instruction inlet 25 is a conventional interface intended to receive programming instructions and/or operation instructions and convert them into instructions liable to be interpreted by the processor 22. Through the inlet 25, the user may choose appropriate operational programming, including stunning tension, stunning current, stunning frequency, stunning wave form, or may simply choose one of the pre-programmed acting forms; program system variants, such as, in a preferential way of embodiment of the invention, distance, in hooks, between sensors 15, 16 and the tub 14 and the capacity of the tub 14 in hooks or, in an alternative way of embodiment, the distance between hooks 12 of the line 11, the size of the tub 14, etc.; request the display 26 to show some operational condition, readings, calculations, etc. per bird or per batch, and finally act over the possible operations of the device 22. Alternatively, the device 20 may be knowingly connected to a physical or wireless network, so to receive instructions from a remote place to the device 20.

The inlet 27 of the sensor groups is an interface enabling the processor to interpret data as detected by the sensors. Depending on the type of sensor used, this interface may not be required.

The display 26 is a conventional monochrome or color display, intended to present information as generated by the processor 22, as per user's commands. Alternatively, the device 20 may be knowingly connected to a physical or wireless network, so to send information to a remote place to the device 20.

Finally, the supply 28 is an intelligent supply, which is fed by the conventional commercial mains supply (110 V, 60 Hz) offering at the outlet tension/current/frequency within the standards as indicated by the processor. The outlet may be in the form of pulses or intermittent tension with widely varied wave shapes, such as sinusoidal, square, saw-toothed, etc., or even with DC tension. The exit frequency from the source 28 may be programmed from zero (DC) to a value of 2500 Hz or higher, according to system requirements.

Concerning the operation of the device 20, it initially receives instructions concerning operational variants (intensity, wave form, current frequency by bird or a group of birds, tension, operation in pulses or intermittently, etc.), both by selection of a pre-programmed form of operation within an option menu, and by individual selection of these standards. Furthermore, the device also receives the characteristics of the equipment, being the number of hooks 12 between sensors 15 and the tub 14 and the capacity of the tub 14 in hooks. Being the selection of the form of operation complete, the system is turned on (movement of the line 11) and the inlet 27 starts to supply the processor 22 with information concerning the passage of each hook 12 and the presence or not of a bird 13 at each corresponding hook. Furthermore, the processor 22 infers how many more hooks should pass through the sensors until said first hook is positioned inside the tub. All this information is stored at the memory 24 or 23, according to each case, for later use by the processor.

When the first bird arrives at the tub, the processor 22 activates the supply 28 so to feed lines 17 and 18 with required tension for a bird to be submitted to stunning current just as programmed by the user. When the second bird enters the tub 14, the processor reprograms the outlet of the supply 28 so that both birds now located inside the tub 14 receive stunning current which is exactly the same as programmed by the user. The operation goes on no matter which is the number of birds inside the tub. The most important is to underline that, whichever is the moment of operation, the processor 22 always knows exactly the quantity of birds (memory 23) which is found inside the tub and thus regulates the supply 28 so that the working power as supplied (by means of lines 17 and 18) is such that each bird will receive stunning current within the characteristics as specified by the user.

At the end of the daily operation or when the user considers as necessary, the device 20 may also supply a general histogram or by period, inform the number of slaughtered birds and any other information as stored in the memory 24. As stated, such information may simply appear on the display 26 or be sent to a remote place through a physical or wireless network.

Finally, a last object of the present invention relates to a method for bird stunning. One such method comprises the following steps: to detect, upstream from the tub 14, a hook 12 by means of a first sensor 15 and detect the presence of a bird 13 on said hook 12 by means of a second sensor 16; to store information related to the hook 12 and the presence or not of a bird 13 on said hook 12 until said hook 12 arrives at the tub 14; to calculate how many birds 13 are inside the tub 14; and to control the working power of a supply 28 so that, no matter which is the calculated number of birds inside the tub, each bird receives stunning current which is equal to a pre-programmed stunning current.

Despite we have shown and disclosed the preferred ways of embodiment, various modifications and substitutions may be effected, not escaping from the spirit and scope of the invention. It should therefore be understood that the present invention was disclosed as an illustration and not as a limitation.

What is claimed is:

1. System for the control of stunning current in a bird slaughtering equipment, said system comprising a line (11) supporting a series of equally distant hooks (12), a stunning tub (14), birds (13) are tied by their feet to the hooks (12) and are subjected to stunning current when partially dipped into the tub (14), the stunning current is supplied by a device (20), which controls the stunning current, the device having poles that are connected to the line (11) and the tub (14) respectively by lines (17) and (18), the system includes a first sensor group (15) designed to detect the presence of hooks (12) and a second sensor group (16) designed to detect the presence of birds (16), first and second sensor groups (15, 16) being located upstream from the tub (14), said stunning current controlling device (20) supplying stunning current which is a function of the real an actual number of birds inside the tub (14) at the time of stunning.

2. The system of claim 1, wherein said stunning current controlling device (20) is pre-programmed with stunning characteristics to be applied to each bird (13) and supplies the lines (17, 18) with electrical power so that an average electrical current per bird flows through each bird (13) inside the tub (14) within pre-programmed standards.

3. The system of claim 2, wherein the stunning characteristics include current, frequency, wave form and tension.

4. The system of claim 1, wherein said stunning current controlling device (20) comprises a first inlet (25) to receive information concerning pre-programming stunning current; a second inlet (27) to receive signals coming from said first and second sensor groups (15, 16); at least one memory (23, 24) so to store information as received; at least one processor (22) to process information as received and to store information as processed in at least one memory (24, 23); to recover from the at least one memory (23, 24) information as received and processed when necessary; as well as to process and supply outlet standards to the stunning current as a function of an actual number of birds (13) inside the tub (14); and an intelligent power supply (28), configured to emit working power through the lines (17, 18) as a function of outlet standards as supplied by the at least one processor (22).

5. The system of claim 4, wherein the first inlet (25) comprises information regarding stunning standards, in the form of exact values, minimum values, maximum values or a range of values for the stunning current, stunning tension, stunning frequency and stunning wave form.

6. The system of claim 4, wherein the second inlet (27) comprising an interface between sensor groups (15, 16) and the at least one processor (22).

7. The system of claim 4, wherein the at least one memory (24, 23) comprises a load memory (23) for the tub, storing the number of birds (13) inside the tub (14), said memory (23) being updated at each inlet/outlet of a hook (12) in a region over the tub (14).

8. Bird stunning method, comprising:
   detecting, upstream from the tub (14), a hook (12) by a first sensor (15) and detecting the presence of a bird (13) at said hook (12) through a second sensor (16);
   storing information concerning the hook (12) and the presence or not of a bird (13) on said hook (12) until said hook (12) arrives at the tub (14);
   calculating how many birds (13) there are inside the tub (14); and
   controlling the working power of a supply (28) so that, regardless of the calculated number of birds inside the tub, each bird receives a stunning current which is equal to a pre-programmed stunning current.

9. Stunning current controlling device, comprising a first inlet (25) to receive information concerning pre-programming stunning current; a second inlet (27) to receive signals coming from said first and second sensor groups (15, 16); at least one memory (23, 24) so to store information as received; at least one processor (22) to process information as received and to store information as processed in at least one memory (24, 23); to recover from the at least one memory (23, 24) information as received and processed when necessary; as well as to process and supply outlet standards to the stunning current as a function of an actual number of birds (13) inside a tub (14); and an intelligent power supply (28) able to emit working power through lines (17, 18) as a function of outlet standards as supplied by the at least one processor (22).

10. The device of claim 9, wherein the first inlet (25) comprises information regarding stunning standards, in the form of exact values, minimum values, maximum values or a range of values for the stunning current, stunning tension, stunning frequency and stunning wave form.

11. The device of claim 9, wherein the second inlet (27) comprising an interface between sensor groups (15, 16) and the at least one processor (22).

12. The device of claim 9, wherein the at least one memory (24, 23) comprises a load memory for the tub (23) storing the number of birds (13) are located inside the tub (14), said memory (23) updated at each inlet/outlet of a hook (12) in the region over the tub (14).

* * * * *